Feb. 22, 1938.  W. A. HEINRICH  2,108,856

ELECTRICAL CONNECTER

Filed May 20, 1935

INVENTOR
WALTER A. HEINRICH
BY E. M. Harrington,
ATTORNEY

Patented Feb. 22, 1938

2,108,856

UNITED STATES PATENT OFFICE 2,108,856

ELECTRICAL CONNECTER

Walter A. Heinrich, St. Louis, Mo., assignor to James R. Kearney Corporation, St. Louis, Mo., a corporation of Missouri Application May 20, 1935, Serial No. 22,410

4 Claims. (Cl. 173—263)

This invention relates generally to electrical connecters of the split bolt and nut type adapted for single-hand application to overhead or other electrical conductors, and more specifically to an improved electrical connecter of this type which is especially constructed to facilitate taping or insulating thereof, the predominant object of the invention being to provide a connecter of the type mentioned which includes improved means providing for yieldable attachment of the nut and the washer of the connecter to the split bolt thereof when said nut and washer are detached from the screw-threaded shank portion of said split bolt.

Figure 1:
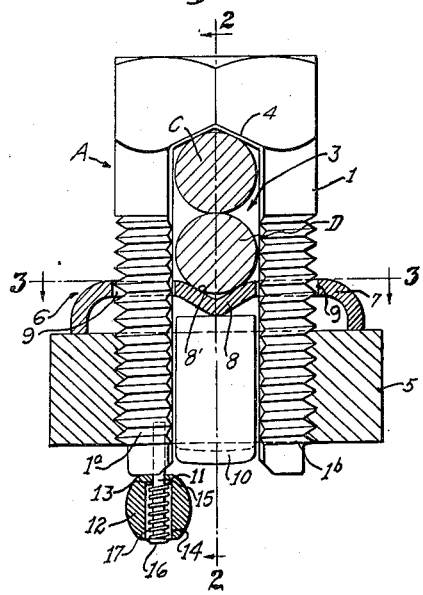
Fig. 1 is an enlarged vertical section of the improved electrical connecter, but with the split bolt thereof shown in elevation.

In the drawing, wherein is shown for the purpose of illustration, merely, one embodiment of the invention, A designates the improved connecter generally. The connecter A includes a bolt 1 which provides the body portion of the connecter, said bolt having a head portion 2 and being provided with a longitudinal, medial slot 3 which extends inwardly from the outer end of the bolt shank to the under or inner side of the bolt head. The slot 3 terminates at the headed end of the bolt in a groove 4 which traverses the under side of the bolt head and provides a seat for a conductor C.

Figure 3:
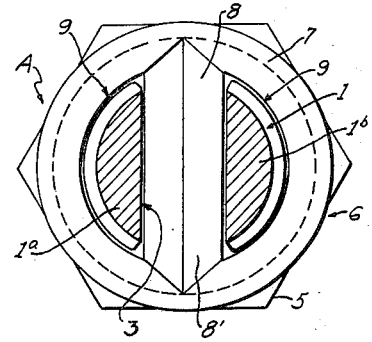
Fig. 3 is a horizontal section on line 3—3 of Fig. 1.

Threaded on the split, screw-threaded shank portion of the bolt 1 is a nut 5 which has permanently associated therewith a washer 6, the connection between the washer and the nut being such as to permit the nut to rotate relative to the washer. The washer preferably comprises an annular portion 7 which surrounds the spaced apart shank portions 1a and 1b, and the outer, marginal portion of the annular portion 7 is turned to provide a skirt portion which bears edgewise upon the upper face of the nut 5. The washer 6 includes also a bridge portion 8 which, by preference, is longitudinally grooved to provide a seat 8' for a conductor D, and the presence of this bridge portion provides the washer with segmental openings 9 through which the correspondingly shaped shank portions 1a and 1b pass (see Fig. 3). The washer 6 is provided with a pair of fingers 10, which are extended from the skirt portion of the washer at points adjacent to the opposite ends of the bridge portion 8, these fingers being projected initially inwardly and then downwardly and outwardly through the bore of the nut. The free ends of the fingers underlie the lower face of the nut and maintain the nut and washer in such assembled relation as to permit the nut to rotate about the screw-threaded bolt shank while the washer moves in a non-rotatable manner longitudinally of said bolt shank. Portions of the bridge portion 8 and fingers 10 are disposed in the bolt slot when the nut and washer are mounted on the shank portion of the bolt and are of substantially the same width as the bolt slot, and accordingly said portions of said bridge portion and fingers serve as spacers to prevent the shank portions 1a and 1b from being drawn toward each other when the nut is turned up tightly thereon.

Figure 2:
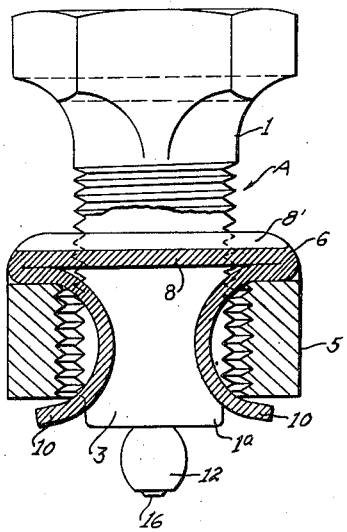
Fig. 2 is a vertical section on line 2—2 of Fig. 1, with the split bolt shown in elevation and a part thereof broken away.

The shank portion 1a is provided with an extension in the form of a rod 11 which is driven into an opening formed in the lower portion of said shank portion, or is otherwise fixedly associated therewith, and mounted on the lower end portion of said rod 11 is a ball-like element 12. The element 12 has formed therein at its upper end an opening 13 through which the rod 11 passes, said opening 13 being of substantially the same diameter as said rod. This opening 13 communicates with an opening 14 of larger diameter formed in the ball-like element which preferably is open at the lower face of said element, a shoulder 15 being provided at the point where the openings 13 and 14 meet. At the lower end of the rod 11 said rod is riveted over or is otherwise provided with an enlarged head 16, and interposed between the head 16 of the rod and the shoulder 15 within the ball-like element is an expansible and contractile coil spring 17. The coil spring 17 normally tends to expand, and this results in the ball-like element 12 being urged upwardly on the rod 11 and into contact with the lower face of the shank portion that carries the rod, as shown in Figs. 1 and 2. It is important to note that the ball-like element 12 is of a size slightly larger than the segmental opening 9 through which the shank portion 1a extends.

Figure 4:
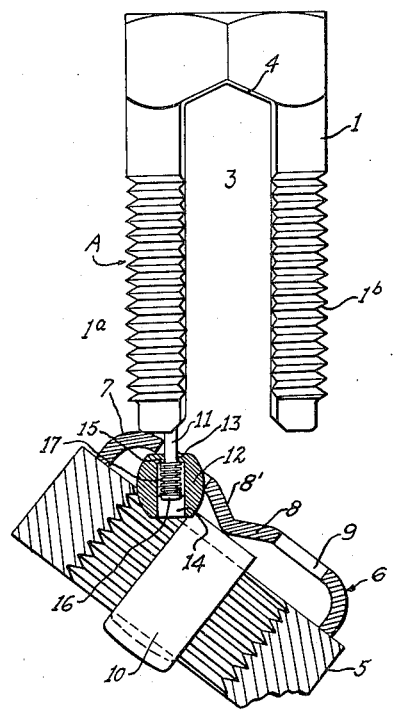
Fig. 4 is a view similar to Fig. 1, but showing the nut assembly of the connecter out of screw-threaded engagement with respect to the screw-threaded shank portion of the split bolt.

When the improved connecter is to be applied to conductors, the nut is unscrewed from the bolt shank whereupon the nut and the associated washer will assume the approximate positions illustrated in Fig. 4, the ball-like element 12 retaining the nut and washer in loosely connected relation relative to the bolt because of the fact, as already stated herein, that said element is too large to pass through the segmental opening 9 in the washer through which the rod 11 is extended and therefore provides a swivel connection between the nut assembly and the bolt. Thus a lateral opening is provided between the lower end of the shank portion 1b and the upper face of the washer, and because of the resilient connection between the bolt shank and the nut and washer provided by the coil spring 17, the nut and washer assembly may be drawn downwardly to increase such lateral opening to permit passage therethrough of conductors of larger diameters.

The advantages derived from the use of the improved means disclosed herein for retaining the nut and washer assembly of the connecter in position relative to the bolt of the connecter will be more fully appreciated when it is considered that connecters of the split bolt and nut type are employed to a large extent on overhead lines, as for the purpose of connecting a tap conductor to a main or feeder line. While located on a pole or other support a lineman customarily holds the tap conductor in one hand and manipulates the connecter device with the other hand until a preliminary connection is effected, a wrench or other suitable tool being thereafter applied to the connecter to complete the connection. This operation is greatly simplified by the use of a connecter constructed and arranged as described herein, since it is capable of being very conveniently hooked on a line and requires a simple, one-hand operation for applying the nut assembly to the threaded shank of the bolt.

Another advantage of the invention is that the construction and arrangement of the improved connecter facilitates taping or insulating the connecter, inasmuch as the coil spring 17 draws the ball-like element 12 upwardly against the lower end of the bolt shank when the nut assembly is applied to the bolt. Thus the improved structure is of a compact nature, and includes no extensions or other portions which would interfere with convenient taping of the connecter.

I claim:

1. An electrical connecter comprising a threaded body member having laterally spaced shank portions, a nut assembly normally threaded on said body member, and means for providing a connection between said nut assembly and said body portion when the nut assembly is unscrewed therefrom, said means including an extension projected from one of said shank portions, a member mounted on said extension for movement longitudinally thereof and adapted to engage said nut assembly when same is unscrewed from said shank portions in a manner to prevent disengagement of said nut assembly from said extension, and yieldable means for urging said member in one direction relative to said extension and permitting movement of said member in the opposite direction relative to said extension so as to increase the distance between the nut assembly and the threaded body portion in order to permit passage therebetween of conductors.

2. An electrical connecter comprising a threaded body member having laterally spaced shank portions, a nut assembly normally threaded on said body member, and means for providing a connection between said nut assembly and said body portion when the nut assembly is unscrewed therefrom, said means including an extension projected from one of said shank portions, a member mounted on said extension for movement longitudinally thereof and adapted to engage said nut assembly when same is unscrewed from said shank portions in a manner to prevent disengagement of said nut assembly from said extension, and a coil spring for urging said member in one direction relative to said extension and permitting movement of said member in the opposite direction relative to said extension so as to increase the distance between the nut assembly and the threaded body portion in order to permit passage therebetween of conductors.

3. An electrical connecter comprising a threaded body member having laterally spaced shank portions, a nut assembly normally threaded on said body member, and means for providing a connection between said nut assembly and said body portion when the nut assembly is unscrewed therefrom, said means including an extension projected from one of said shank portions, a member mounted on said extension for movement longitudinally thereof and adapted to engage said nut assembly when same is unscrewed from said shank portions in a manner to prevent disengagement of said nut assembly from said extension, and a coil spring for urging said member in one direction relative to said extension and permitting movement of said member in the opposite direction relative to said extension so as to increase the distance between the nut assembly and the threaded body portion in order to permit passage therebetween of conductors, said coil spring being located within said member.

4. An electrical connecter comprising a threaded body member having laterally spaced shank portions, a nut assembly normally threaded on said body member, and means for providing a connection between said nut assembly and said body portion when the nut assembly is unscrewed therefrom, said means including an extension projected from one of said shank portions, a member mounted on said extension for movement longitudinally thereof and adapted to engage said nut assembly when same is unscrewed from said shank portions in a manner to prevent disengagement of said nut assembly from said extension, and a coil spring for urging said member in one direction relative to said extension and permitting movement of said member in the opposite direction relative to said extension so as to increase the distance between the nut assembly and the threaded body portion in order to permit passage therebetween of conductors, said coil spring being located within said member and acting at its opposite ends against portions of said extension and member, respectively.

WALTER A. HEINRICH.